United States Patent
Fujii (10) Patent No.: US 9,227,567 B2
(45) Date of Patent: Jan. 5, 2016

(54) OPERATION NOTIFICATION SOUND EMISSION DEVICE FOR VEHICLE

(75) Inventor: Naoki Fujii, Anjo (JP)

(73) Assignee: DENSO CORPORATION, Kariya (JP)

( * ) Notice: Subject to any disclaimer, the term of this patent is extended or adjusted under 35 U.S.C. 154(b) by 940 days.

(21) Appl. No.: 13/425,447

(22) Filed: Mar. 21, 2012

(65) Prior Publication Data

US 2012/0242467 A1  Sep. 27, 2012

(30) Foreign Application Priority Data

Mar. 22, 2011 (JP) .................................. 2011-62954

(51) Int. Cl.
  *B60Q 5/00* (2006.01)
  *G10K 15/02* (2006.01)

(52) U.S. Cl.
  CPC ............... *B60Q 5/008* (2013.01); *G10K 15/02* (2013.01)

(58) Field of Classification Search
  CPC .......... B60Q 5/008; B60Q 1/506; B60Q 9/00; G10K 15/02; A63H 19/24
  See application file for complete search history.

(56) References Cited

U.S. PATENT DOCUMENTS

| | | | | | |
|---|---|---|---|---|---|
| 4,403,208 | A | * | 9/1983 | Hodgson et al. | ............... 340/902 |
| 5,517,173 | A | * | 5/1996 | Cha et al. | ................... 340/404.1 |
| 5,635,903 | A | * | 6/1997 | Koike et al. | ................... 340/441 |
| 7,770,847 | B1 | * | 8/2010 | Severson | ........................... 246/3 |
| 7,979,147 | B1 | * | 7/2011 | Dunn | ............................... 700/94 |
| 2002/0082754 | A1 | * | 6/2002 | Robichaux et al. | ............. 701/22 |
| 2004/0260433 | A1 | * | 12/2004 | Sawada et al. | ..................... 701/1 |
| 2005/0069150 | A1 | * | 3/2005 | Kirk | ................................. 381/97 |
| 2005/0195092 | A1 | * | 9/2005 | Takahashi et al. | ............. 340/692 |
| 2005/0200462 | A1 | * | 9/2005 | Maekawa et al. | ............. 340/435 |
| 2007/0001058 | A1 | * | 1/2007 | Severson | ....................... 246/1 R |
| 2007/0257783 | A1 | * | 11/2007 | Matsumoto et al. | ........ 340/425.5 |
| 2009/0066499 | A1 | * | 3/2009 | Bai et al. | ........................ 340/459 |
| 2009/0079262 | A1 | * | 3/2009 | Ohtomo | ........................ 307/10.6 |
| 2010/0045450 | A1 | * | 2/2010 | Suzuki et al. | .................. 340/438 |
| 2010/0231368 | A1 | * | 9/2010 | Nakayama et al. | ......... 340/425.5 |
| 2011/0010030 | A1 | * | 1/2011 | Yamamoto | ........................ 701/22 |
| 2011/0032087 | A1 | * | 2/2011 | Nakayama et al. | ......... 340/384.1 |
| 2011/0175713 | A1 | * | 7/2011 | Nakayama | .................... 340/435 |
| 2011/0188663 | A1 | * | 8/2011 | Nakayama | ........................ 381/57 |
| 2012/0126969 | A1 | * | 5/2012 | Wilbur et al. | .................. 340/466 |
| 2012/0139716 | A1 | * | 6/2012 | Nagamine et al. | ............. 340/438 |
| 2012/0312609 | A1 | * | 12/2012 | Takewaka et al. | ............ 180/65.1 |
| 2012/0316734 | A1 | * | 12/2012 | Takagi | ............................. 701/45 |

FOREIGN PATENT DOCUMENTS

| | | |
|---|---|---|
| JP | 5-208636 | 8/1993 |
| JP | 2000-316201 | 11/2000 |
| JP | 2005-289175 | 10/2005 |
| JP | 2005-343360 | 12/2005 |

* cited by examiner

*Primary Examiner* — Hai Phan
*Assistant Examiner* — Orlando Bousono
(74) *Attorney, Agent, or Firm* — Nixon & Vanderhye PC (57) ABSTRACT

A vehicle travels with a traveling electric motor controlled with a first control device. A synthetic circuit receives a driving signal from a second control device, which is for controlling another electric motor distinct from the traveling electric motor. The synthetic circuit synthesizes, according to the driving signal, the operation notification sound imitative of a motor sound emitted from the traveling electric motor. An emission unit emits an operation notification sound synthesized by the synthetic circuit to notify the vehicle being in an operation state.

10 Claims, 4 Drawing Sheets

OPERATION NOTIFICATION SOUND EMISSION DEVICE FOR VEHICLE

CROSS REFERENCE TO RELATED APPLICATION

This application is based on Japanese Patent Application No. 2011-62954 filed on Mar. 22, 2011, the disclosure of which is incorporated herein by reference.

TECHNICAL FIELD

The present disclosure relates to an operation notification sound emission device for a vehicle equipped with an electric motor as a power source, to emit sound to notify the vehicle being in an operation state with the electric motor.

BACKGROUND

In general, a vehicle employing an electric motor as a power source emits small noise when being ready to travel or when traveling. Therefore, people outside or inside the vehicle can hardly notice the vehicle being ready to travel and can hardly notice the vehicle being traveling. In consideration of this, a proposed device is configured to emit a specific sound to notify people of a vehicle being ready to travel or being traveling.

For example, JP-A-2005-343360 discloses a vehicular device configured to emit a predetermined alarm sound when the vehicle travels with an electric motor. The device of JP-A-2005-343360 employs a microcomputer to generate the alarm sound. The microcomputer is equipped with a memory device storing date related to the alarm sound. In the conventional configuration of JP-A-2005-343360, the microcomputer needs a storage area to store sound source data related to the alarm sound. In addition, a considerable processing load is applied to the microcomputer in order to generate the alarm sound at a high frequency of several kilohertz. Therefore, an exclusive electronic control unit is conventionally requisite to generate an alarm sound with a microcomputer. Alternatively, it is conceivable to employ an existing vehicular electronic control unit with an additional function to generate an operation notification sound. Nevertheless, in this configuration, the existing vehicular electronic control unit needs to be equipped with a high-performance microcomputer. Thus, in a conventional configuration, a large-scale device and/or a large number of additional circuit components are requisite to generate an operation notification sound.

SUMMARY

It is an object of the disclosure to provide an operation notification sound emission device configured to generate an operation notification sound with a simple configuration.

It is another object of the disclosure to provide an operation notification sound emission device configured to generate an operation notification sound with a low cost circuit device without employing a microcomputer.

According to an aspect of the present disclosure, an operation notification sound emission device equipped to a vehicle configured to travel with a traveling electric motor as a power source, the traveling electric motor being configured to be controlled with a first control device, the operation notification sound emission device being configured to emit an operation notification sound to notify the vehicle being in an operation state, the operation notification sound emission device comprises a synthetic circuit configured to receive a driving signal from a second control device for an other electric motor, wherein the second control device is distinct from the first control device, wherein the other electric motor is distinct from the traveling electric motor, and synthesize, according to the driving signal, the operation notification sound imitative of a motor sound emitted from the traveling electric motor. The operation notification sound emission device further comprises an emission unit configured to emit the operation notification sound synthesized by the synthetic circuit.

According to another aspect of the present disclosure, an operation notification sound emission device equipped to a vehicle configured to travel with an traveling electric motor as a power source, the operation notification sound emission device being configured to emit an operation notification sound to notify the vehicle being in an operation state, the operation notification sound emission device comprises a synthetic circuit configured to synthesize the operation notification sound, which is imitative of a motor sound emitted from the traveling electric motor, according to a signal for driving an inverter connected between a control device for the traveling electric motor and the traveling electric motor. The operation notification sound emission device further comprises an emission unit configured to emit the operation notification sound synthesized by the synthetic circuit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As follows, embodiments will be described with reference to drawings. In the embodiments, an element described in a subsequent embodiment may be denoted by the same reference numeral, and description of such an element may be omitted. When only a part of a configuration of an element is described in an embodiment, other part of the configuration of the element may be equivalent to that of another foregoing embodiment. Combinations of elements are not limited to those specified in an embodiment. As long as a combination does not cause a defect, any combinations of elements and embodiments may be made.

First Embodiment

Figure 1:
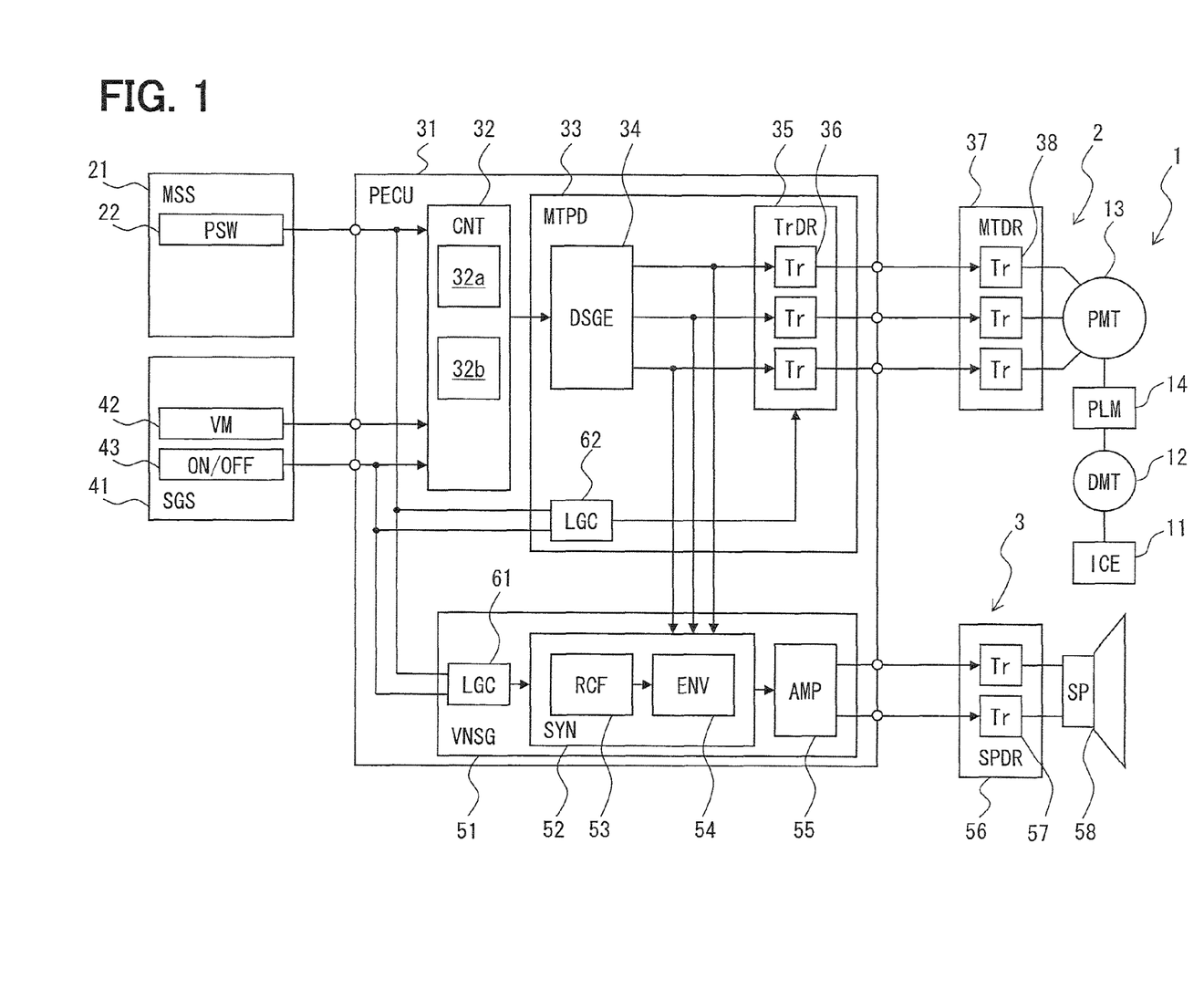
FIG. 1 is a block diagram showing a vehicular system including an operation notification sound emission device according to the first embodiment.

FIG. 1 is a block diagram showing a vehicular system 1 including an operation notification sound emission device 3 related to the first embodiment. The vehicle is equipped with an internal combustion engine (ICE) 11 and an electric motor (DMT) 12. The electric motor 12 is a three-phase electric motor. The electric motor 12 is a motor alternator configured to function selectively as an electric motor or a generator. The electric motor 12 is driven with three-phase electric power. The electric motor (traveling electric motor) 12 is used for traveling. The vehicle is configured to travel only with the electric motor 12 at least temporarily. The vehicle is a hybrid vehicle configured to utilize at least one of the internal combustion engine 11 and the electric motor 12 as a power source for traveling. The vehicle is configured to stop the internal combustion engine 11 and to travel only with the electric motor 12 when a predetermined condition is satisfied. When traveling only with the electric motor 12, the vehicle emits relatively small noise, compared with the state where the internal combustion engine 11 is operated. In consideration of this, it is desired to emit an operation notification sound for notifying people in the vehicle and outside the vehicle of traveling of the vehicle, when the vehicle travels only with the electric motor 12. It is noted that, an operation notification sound may be emitted in a state where the vehicle is ready to travel. In the present disclosure, the term of "operation" or "operation state" represents both the state where the vehicle is traveling and the state where the vehicle is traveling or ready to travel. The operation notification sound may be also denoted by a vehicle proximity sound, a proximity annunciation sound, and/or a proximity alarm, when being used in order to notify a pedestrian of proximity of a vehicle. Dissimilarly to a conventional sound such as a horn-buzzer sound, the operation notification sound is emitted continuously during the vehicle travels at a predetermined low speed.

The vehicle is equipped with multiple electric motors in addition to the electric motor 12 for traveling. The additional electric motors are included in vehicular auxiliary devices for operating the vehicular auxiliary devices. For example, the vehicular system 1 includes a parking lock device 2 as one of the auxiliary devices including the electric motors. The parking lock device 2 includes an electric motor (PMT) 13, a parking lock mechanism (PLM) 14, and its control devices (second control device) 21-38. The electric motor 13 belongs to the parking lock device 2 being one of the vehicular auxiliary devices. The parking lock device 2 functions as a vehicular electric motor system. The electric motor 13 is a distinct electric motor independent from the electric motor 12 for traveling. The electric motor 13 may be a separate motor from the electric motor 12 for traveling. The electric motor 13 drives the parking lock mechanism 14. The electric motor 13 has a configuration equivalent to that of the electric motor 12 for traveling the vehicle. The electric motor 13 is a three-phase electric motor. The electric motor 13 is driven with a driving signal, which is in the same category as the driving signal of the electric motor 12. The electric motor 13 is driven with three-phase electric power. The electric motor 13 is a switched reluctance motor (SR motor).

The parking lock mechanism 14 is equipped in a drive train of the vehicle. The drive train includes the internal combustion engine 11 and the electric motor 12. The parking lock mechanism 14 locks the drive train of the vehicle when being in a parking position thereby to prohibit the vehicle from traveling. Alternatively, the parking lock mechanism 14 releases the lock of the drive train of the vehicle when being in a drive position thereby to set the state where the vehicle is ready to travel. The parking lock mechanism 14 restricts the electric motor 12 mechanically to prohibit rotation of the electric motor 12.

The control devices 21-38 includes a signal input device (MSS) 21 for receiving an input signal necessary for causing the parking lock device 2 to operate. The signal input device 21 further includes a parking lock switch device (PSW) 22 configured to send a parking lock operation signal for instructing the parking lock device 2 to activate or release the lock when operated by a user such as a driver. The control devices 21-38 further include an electronic control unit (PECU) 31, which is referred as an ECU 31, for parking lock and a driver circuit (MTDR) 37.

The ECU 31 includes a control circuit (CNT) 32 and a pre-driver circuit (MTPD) 33. The control circuit 32 is configured with a microcomputer including a readable storage medium. The storage medium stores a program readable by a computer. The storage medium may be a memory device such as a volatile memory and/or a non-volatile memory. When being executed by a control device, the program functions to operate the control device, as specified in the present disclosure, and to operate the control device to implement a control method as specified in the present disclosure. Each unit of the control device may be denoted by a functional block or a module for producing a predetermined function. The control circuit 32 may be configured with an analog circuitry. The control circuit 32 sends a signal representing an instruction value for controlling the electric motor 13, according to multiple input signals. The control circuit 32 may include multiple blocks for producing multiple functions. Specifically, the control circuit 32 may include multiple blocks configured to produce, for example, a function to detect the position of a rotor, a function to detect an output torque of the electric motor 13, and a function to detect an output current to the electric motor 13. Alternatively or in addition, the control circuit 32 may include multiple blocks configured to produce, for example, a function to implement feedback control of the rotary position of the electric motor 13 and a function to adjust the gain in the feedback control.

The control circuit 32 includes a first control unit 32a for controlling the parking lock device 2. The control circuit 32 further includes a second control unit 32b for generating a signal as a sound source of the operation notification sound.

The pre-driver circuit 33 generates a control signal for driving the driver circuit 37 according to the instruction value from the control circuit 32. The pre-driver circuit 33 includes a driving signal generation circuit (DSGE) 34 and a transistor driver circuit (TrDR) 35. The driving signal generation circuit 34 sends a three-phase driving signal according to the instruction value from the control circuit 32. The output circuit 35 includes multiple transistor elements (Tr) 36. The output circuit 35 sends a three-phase driving signal.

The driver circuit 37 controls an electric current flowing into the electric motor 13. The driver circuit 37 includes multiple transistor elements (Tr) 38. The driver circuit 37 is configured with, for example, a three-phase inverter circuit.

The vehicular system 1 includes an operation notification sound emission device 3 for emitting operation notification sound when the vehicle is in the operation state. The operation notification sound emission device 3 emits a sound similar to a noise caused when the electric motor 12 is supplied with electricity, thereby to notify the vehicle being in the operation state. The operation notification sound emitted from the operation notification sound emission device 3 is a sound, which is synthesized to imitate the noise of the electric motor 12. The sound emitted from the electric motor 12 attributes to change in the electric current flowing through the three-phase winding. More specifically, the sound emitted from the electric motor 12 attributes to, for example, switching of the electric current. That is, change in the three-phase electric current flowing into the electric motor 12, i.e., change in the three-phase voltage applied to the electric motor 12 causes vibration in the structure body of the electric motor 12 to result in emission of the sound audible to a person. The operation notification sound emission device 3 utilizes the control devices 21-38, which are provided for driving the electric motor 13, to generate to emit the operation notification sound imitating the sound of the electric motor 12. The operation notification sound emission device 3 obtains the control signal from the control devices 21-38 for the electric motor 13, which is distinct from and other than the electric motor 12, to retrieve a signal similar to the driving signal of the electric motor 12. The operation notification sound emission device 3 causes the control devices 21-38 for the parking lock device 2 to operate so as to generate a signal similar to the signal for driving the electric motor 12. The operation notification sound emission device 3 extracts a component, which causes the sound of the electric motor 12, according to the imitative driving signal obtained from the control devices 21-38, generates the operation notification sound according to the extracted component, and emits the generated sound.

The operation notification sound emission device 3 further includes a signal input device (SGS) 41 for receiving an input signal necessary for emitting the operation notification sound. The signal input device 41 includes a vehicle speed sensor (VM) 42 for detecting the traveling speed of the vehicle. The traveling speed is used to terminate the operation notification sound when the traveling speed of the vehicle is greater than or equal to a predetermined speed. The traveling speed is used also to change the volume and/or the frequency of the operation notification sound in proportion to the traveling speed when the traveling speed is less than or equal to a predetermined speed. The signal input device 41 includes a prohibition device (ON/OFF) 43 to receive a signal representing permission or prohibition of emission of the operation notification sound. The control circuit 32 receives the signals from the signal input device 41.

In response to the signals from the signal input devices 21 and 41, the second control unit 32b sends the imitative instruction value for causing the operation notification sound according to the vehicle speed. At least the driving signal generation circuit 34 receives the imitative instruction value. The driving signal generation circuit 34 sends the three-phase driving signal according to the instruction value from the second control unit 32b. When the second control unit 32b sends the instruction value, the second control unit 32b and the driving signal generation circuit 34 may send a driving signal at a frequency such that the electric motor 13 cannot respond to the driving signal. The present configuration enables to restrict undesirable movement of the electric motor 13.

The operation notification sound emission device 3 is configured with an analog circuit and/or a digital logic circuit, without a microcomputer requiring a software program and a memory unit. The operation notification sound emission device 3 includes a sound signal generator circuit (VNSG) 51, a speaker driver circuit (SPDR) 56, and a speaker (SP) 58. The sound signal generator circuit 51 is accommodated in the ECU 31 for the parking lock device 2. The sound signal generator circuit 51 generates a signal for emitting the operation sound of the vehicle. The sound signal generator circuit 51 includes a synthetic circuit (SYN) 52 and an amplification circuit (AMP) 55.

The synthetic circuit 52 receives the three-phase driving signal in the parking lock device 2 and synthesizes the signal for emitting the sound similar to the operation sound caused by the electric motor 12. The synthetic circuit 52 receives a low-voltage signal branched from a circuit between the driving signal generation circuit 34 and the output circuit 35. The synthetic circuit 52 may include a rectification circuit (RCF) 53 and an envelope detection device (ENV) 54. The rectification circuit 53 converts the three-phase signal into an analog signal thereby to generate a three-phase alternating-current waveform. The rectification circuit 53 further implements full-wave rectification on the three-phase alternating-current waveform. The envelope detection device 54 detects and sends the envelope of the full-wave rectification waveform. The waveform of the envelope is equivalent to a ripple component of the three-phase waveform driving the electric motor 12. The waveform of the envelope is a cause of the sound emitted from the electric motor 12. The waveform of the envelope also imitates, i.e., correlates the surge of the electric current flowing into the electric motor 12. In the present configuration, the synthetic circuit 52 synthesizes the operation notification sound including a high frequency component arising from the three-phase driving signal. The synthetic circuit 52 sends the waveform of the envelope. Thus, the synthetic circuit 52 sends the electric signal, according to the three-phase driving signal, for emitting the sound similar to the operation sound emitted from the electric motor 12. The waveform sent from the synthetic circuit 52 is amplified by an amplification circuit 55.

The speaker driver circuit 56 controls an electric current flowing into the speaker 58. The speaker driver circuit 56 includes multiple amplification elements (Tr) 57. The speaker driver circuit 56 amplifies the signal sent from the amplification circuit 55 and supplies the amplified signal to the speaker 58. The speaker 58 is arranged so as to emit the sound mainly to the outside of the vehicle. With the present configuration, the speaker 58 emits the operation notification sound being imitative of the operation sound emitted from the electric motor 12. The amplification circuit 55, the speaker driver circuit 56, and the speaker 58 may be equivalent to an emission unit configured to emit the operation notification sound as an audible sound.

The vehicular system 1 further includes a logic circuit (LGC) 61. When receiving the signal representing prohibition of emission of the operation notification sound from the prohibition device 43, the logic circuit 61 terminates the function of the synthetic circuit 52 thereby to terminate emission of the operation notification sound. The logic circuit 61 further receives the signal of the parking lock switch device 22. The logic circuit 61 may be configured to permit operation of the parking lock device 2 and to terminate the emission of the operation notification sound, when receiving, from the prohibition device 43, the signal, which represents permission of emission of the operation notification sound, and when receiving, from the parking lock switch device 22, the signal, which represents permission of operation of the parking lock device 2. The logic circuit 61 restrains unnecessary power consumption and restrains emission of a sound in an unintentional tone.

The vehicular system 1 further includes a logic circuit (LGC) 62. The logic circuit 62 prohibits operation of the output circuit 35, when at least a part of the control devices 21-38 of the parking lock device 2 is caused to supply the three-phase driving signal to the operation notification sound emission device 3. The logic circuit 62 puts the output circuit 35 into an OFF state to deactivate the output circuit 35 thereby to prohibit operation of the output circuit 35. The logic circuit 62 may be configured to permit operation of the parking lock device 2 and to terminate the emission of the operation notification sound, when receiving, from the prohibition device 43, the signal, which represents permission of emission of the operation notification sound, and when receiving, from the parking lock switch device 22, the signal, which represents permission of operation of the parking lock device 2. The signal for emitting the operation notification sound is at a frequency of several kilohertz. Therefore, even if the signal for emitting the operation notification sound is applied to the electric motor 13 irrelatively to the position of the rotor of the electric motor 13, the electric motor 13 does not rotate. The logic circuit 62 prohibits operation of the output circuit 35 thereby to restrain unnecessary electric power consumption and to restrain the electric motor 13 from causing undesirable vibration and abnormal noise. The logic circuit 62 further functions as a failsafe unit for restricting the electric motor 13 from causing an undesirable movement.

The logic circuits 61 and 62 further function as a prohibition unit to prohibit electricity supply to the electric motor 13 while permitting operation of both the control circuit 32 and the driving signal generation circuit 34 when the operation notification sound is emitted.

The control devices 21-38 controls the electric motor 13 according to the position of the parking lock switch device 22 and/or a shift lever operated by a user such as a driver of the vehicle, thereby to lock the transmission at the parking position or release the lock of the transmission. The electric motor 13 of the parking lock device 2 is supplied with electricity and driven only when the parking lock mechanism 14 is locked at the parking position or the lock of the parking lock mechanism 14 is released. When the vehicle is in the state, in which the vehicle is ready to travel with the electric motor 12, or when the vehicle is traveling with the electric motor 12, the parking lock mechanism 14 is kept in a lock-released state. Therefore, when the vehicle is in the operation state with the electric motor 12, the electric motor 13 is not driven as the parking lock device 2. Emission of the operation notification sound is needed at least when the vehicle is traveling with the electric motor 12. Accordingly, the occasion, in which the electric motor 13 is supplied with electricity to function as the parking lock device 2, and the occasion, in which the emission of the operation notification sound is needed, does not overlap one another. In consideration of this, the control devices 21-38 for the parking lock device 2 can be used to generate the waveform of the sound source of the operation notification sound.

According to the configuration described above, the vehicle operates with the electric motor 12. The electric motor 13 of the auxiliary devices is controlled by the control devices 21-38 to produce those functions. Furthermore, when emitting the operation notification sound, the control devices 21-38 generate the imitative signal to imitate the electric current supplied into the electric motor 12 by using the configuration of the control devices 21-38. The operation notification sound emission device 3 receives the imitative signal and causes the speaker 58 to emit the operation notification sound similar to the sound emitted from the electric motor 12. Consequently, the vehicle is enabled to notify people outside the vehicle and/or inside the vehicle of that the vehicle is in the operation state with the electric motor 12.

In addition, the operation notification sound is synthesized to imitate the sound emitted from the electric motor 12. Accordingly, the operation notification sound is similar to the sound normally emitted from the vehicle. Therefore, a person, who hears the operation notification sound, can be restricted from feeling uncomfortable and/or discomfort.

Furthermore, the operation notification sound emission device 3 generates the imitative signal by using the control devices 21-38, which is for the electric motor 13 being the same kind as the electric motor 12. Accordingly, the operation notification sound emission device 3 does not need a large-capacity memory or the like as a sound source for generating the operation notification sound. Therefore, the operation notification sound can be generated with an additional small-scale circuit or device. Furthermore, the operation notification sound emission device 3 is configured with the analog circuit and/or the digital logic circuit, without a microcomputer requiring a software program and a memory unit. Accordingly, the operation notification sound can be generated, while discomfort is restrained, by employing a low cost circuit device without employing a microcomputer.

Second Embodiment

Figure 2:
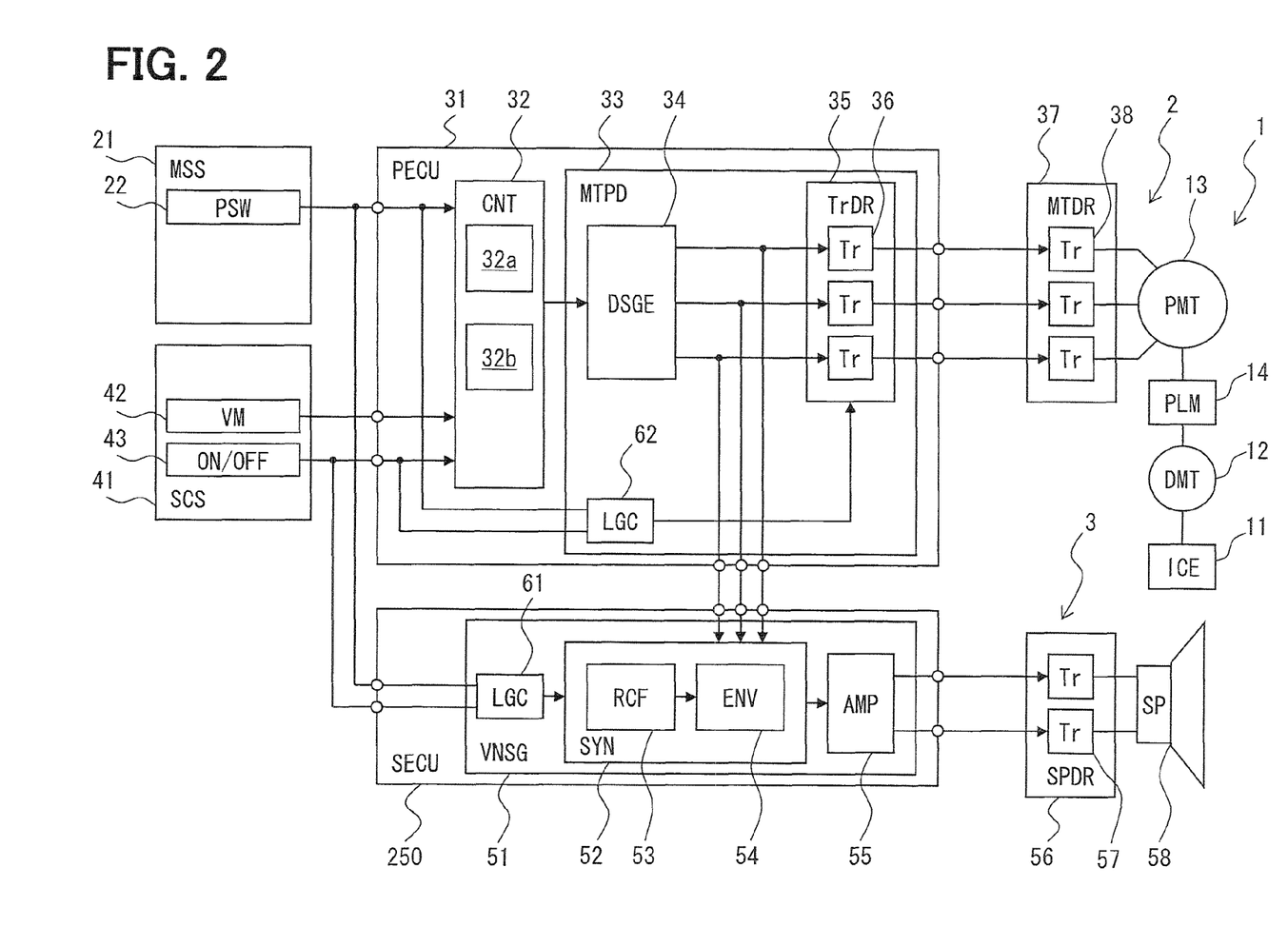
FIG. 2 is a block diagram showing a vehicular system including an operation notification sound emission device according to the second embodiment.

FIG. 2 is a block diagram showing a vehicular system 1 including an operation notification sound emission device 3 related to the second embodiment. In the preceding first embodiment, the sound signal generator circuit 51 is equipped in the ECU 31. According to the present embodiment, the sound signal generator circuit 51 is configured with an electronic control unit (SECU) 250, which is referred to as the ECU 250 for emitting the operation notification sound and is a separate component from the ECU 31. The ECU 250 receives the three-phase driving signal sent from the ECU 31. According to the present embodiment, similar operation effect to that of the preceding first embodiment can be produced.

Third Embodiment

Figure 3:
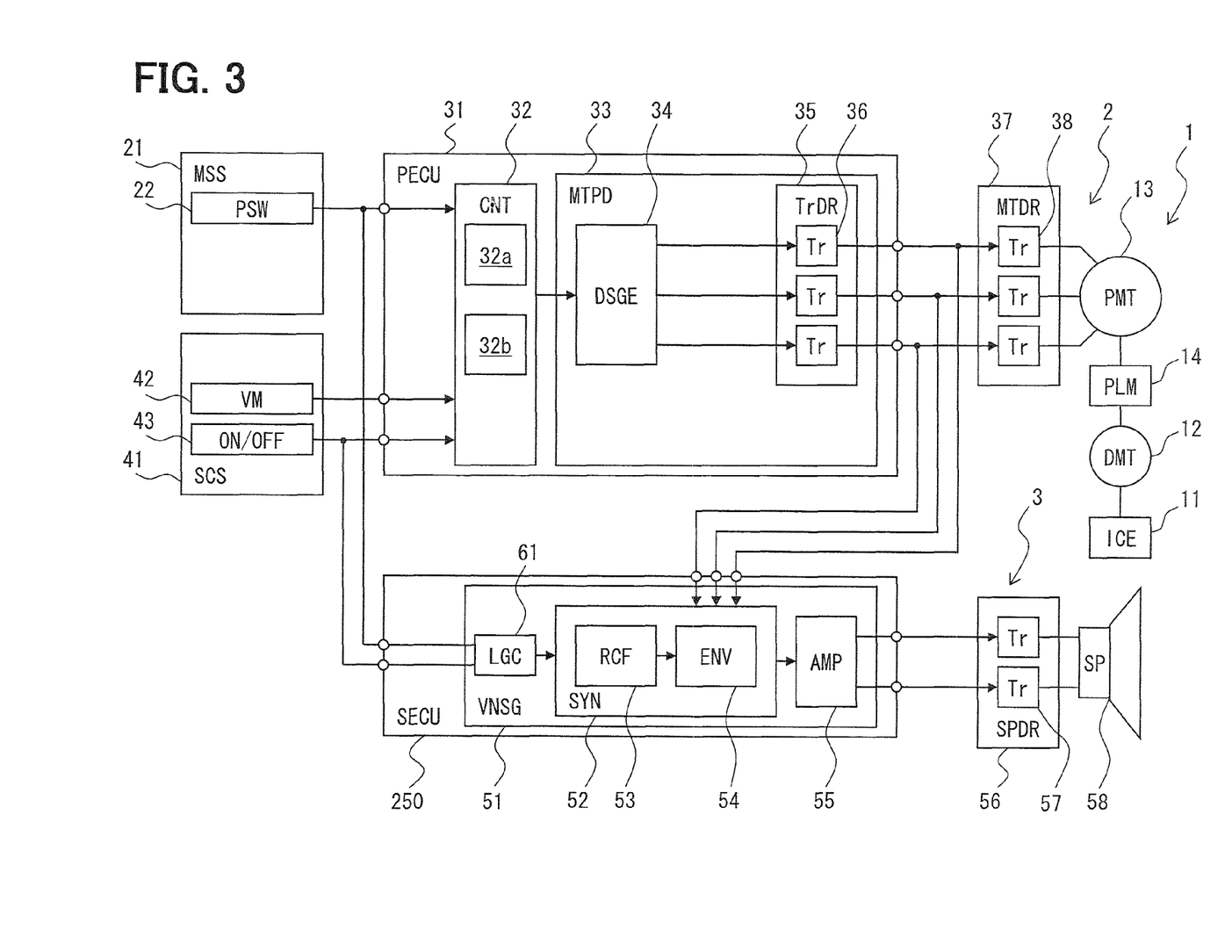
FIG. 3 is a block diagram showing a vehicular system including an operation notification sound emission device according to the third embodiment.

FIG. 3 is a block diagram showing a vehicular system 1 including an operation notification sound emission device 3 related to the third embodiment. According to the present embodiment, the sound signal generator circuit 51 is configured with the ECU 250 being a separate component from the ECU 31. It is noted that, the configuration of the present third embodiment restrains modification needed for the existing ECU 31. Specifically, in the present configuration, the three-phase driving signal is branched from the high-voltage signal circuit between the output circuit 35 and the driver circuit 37. In this way, the ECU 31 need not an additional output terminal. Furthermore, accruing to the present embodiment, the logic circuit 62 is not equipped. Therefore, the present configuration restrains equipment of an additional device to the existing ECU 31. According to the present embodiment, similar operation effect to those of the preceding embodiments can be also produced.

Fourth Embodiment

Figure 4:
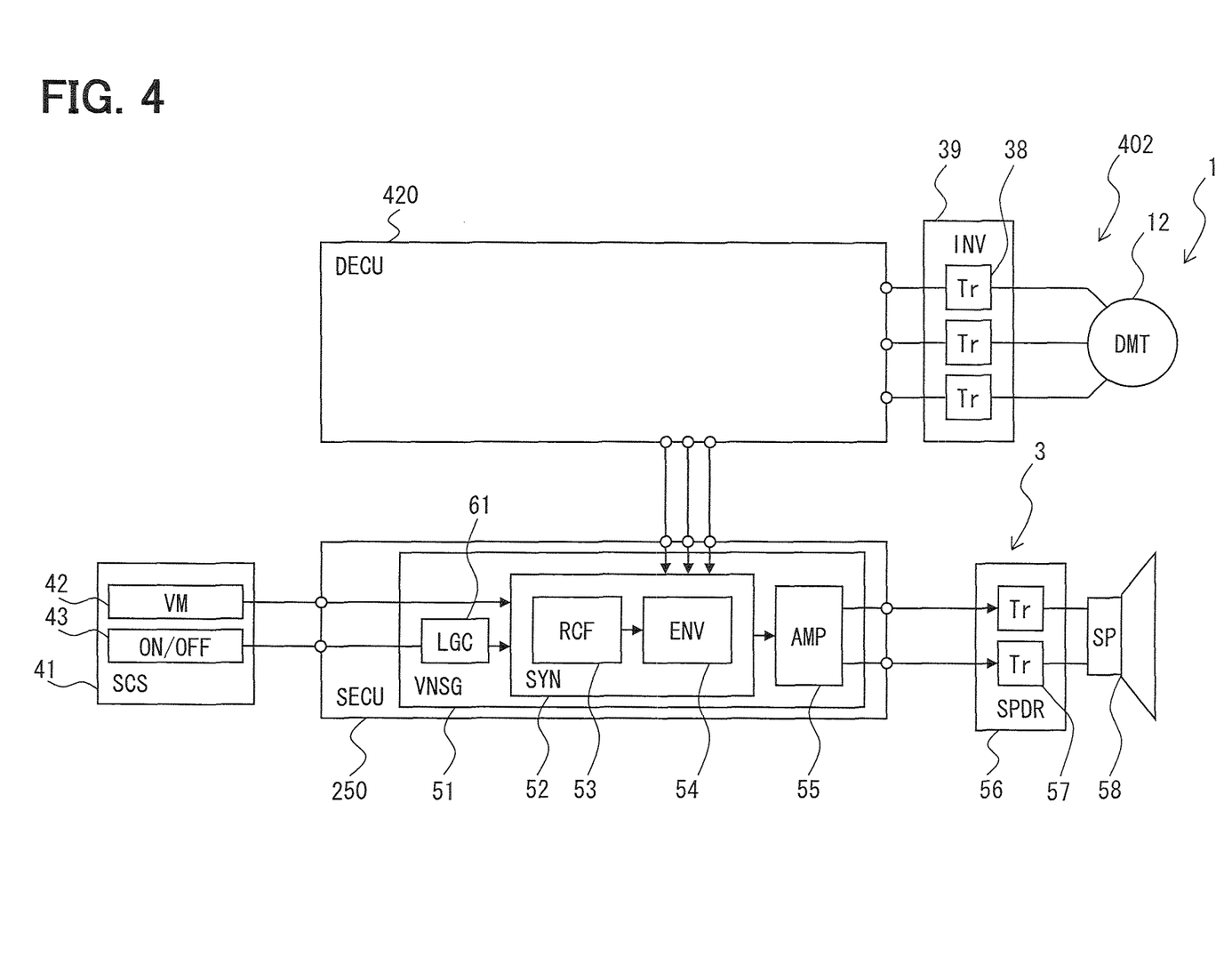
FIG. 4 is a block diagram showing a vehicular system including an operation notification sound emission device according to the fourth embodiment.

FIG. 4 is a block diagram showing a vehicular system 1 including an operation notification sound emission device 3 related to the fourth embodiment. In the preceding embodiments, the control devices 21-38 for the electric motor 13, which is distinct from and other than the electric motor 12 for traveling, is used for generating the imitative signal for the operation notification sound. According to the present embodiment, the driving signal for driving the electric motor 12 is obtained from a control device (first control device) 420 for the electric motor 12 for traveling. The vehicular system 1 includes a traveling control system 402 for controlling the electric motor 12 for traveling. The traveling control system 402 functions as a vehicular electric motor system. The traveling control system 402 includes the electronic control unit (DECU) 420, which is referred to as the ECU 420 for traveling and is configured to control electricity supply to the electric motor 12. The traveling control system 402 further includes an inverter (INV) 39 controlled according to a signal sent from the ECU 420. The ECU 420 functions as a control device to implement a three-phase control to drive the electric motor 12. Specifically, the ECU 420 generates a three-phase driving signal to drive the electric motor 12. The ECU 420 includes a terminal to send the three-phase driving signal. The synthetic circuit 52 receives the three-phase driving signal sent from the ECU 420. The inverter 39 also receives the same three-phase driving signal. With the present configuration, the vehicular system 1 is configured to generate the operation notification sound further similar to the operation sound emitted from the electric motor 12 for traveling.

Other Embodiment

As described above, the embodiments of the present disclosure have been described. It is noted that the present disclosure is not limited to the above embodiments. The present disclosure may be variously modified and may be in practical use in a spirit of the present invention. The configurations of the above embodiments are examples, and the present disclosure is not limited to the above embodiments.

For example, the unit and the function of the control device may be configured with only a software program or a combination of a software program and a hardware configuration. For example, the control device may be configured with an analog circuit.

In the above embodiments, the operation notification sound emission device according to the present disclosure is applied to the vehicle employing both the internal combustion engine 11 and the electric motor 12 for generating output power for traveling. The present disclosure may be applied to a vehicle employing at least an electric motor for generating at least a part of output power for traveling. For example, the present disclosure may be applied to a vehicle employing only an electric motor for generating output power for traveling.

In the above embodiments, the synthetic circuit 52 generates the waveform of the operation notification sound by utilizing the detection result of the envelope. Alternatively, a waveform of a high frequency component arising in the three-phase driving operation may be extracted from the three-phase driving signal, and the extracted waveform of the high frequency component may be employed as a sound source waveform of the operation notification sound.

In the above fourth embodiment, the synthetic circuit 52 receives the signal same as the three-phase driving signal sent to the inverter 39. That is, both the inverter 39 and the synthetic circuit 52 receive the signal sent from the transistor driver circuit (TrDR) included in the ECU 420 in FIG. 4. It is noted that, the synthetic circuit 52 may be configured to receive a low-voltage signal, which is related to driving operation of the inverter 39 and is lower in voltage than the signal sent from the inverter 39. Specifically, the synthetic circuit 52 may receives, for example, an input signal of the transistor driver circuit (TrDR). To cite one example, the signal sent from the inverter 39 is at a high voltage beyond 600V, the three-phase driving signal sent to the inverter 39, i.e., the signal sent from the transistor driver circuit (TrDR) of the ECU 420 is about 12V, and the three-phase driving signal sent to the transistor driver circuit (TrDR) is about 5V. In consideration of this, it is suitable to cause the synthetic circuit 52 to receive the signal sent from the transistor driver circuit (TrDR) and the input signal of the transistor driver circuit (TrDR), rather than the signal sent from the inverter 39.

As described above, the operation notification sound emission device is equipped to a vehicle configured to travel with the electric motor (traveling electric motor) for traveling (12), as a power source. The operation notification sound emission device is configured to emit the operation notification sound to notify the vehicle being in an operation state. The operation notification sound emission device may include a synthetic circuit (52) configured to receive the driving signal from the control devices (second control device: 21-38), which is for the electric motor (distinct electric motor, other electric motor 13), other than (distinct from) a control device (420) for the electric motor for traveling and to synthesize, according to the driving signal, the operation notification sound imitative of a sound emitted from the electric motor for traveling. In this case, the operation notification sound emission device may further include the emission unit (55, 56, 58) configured to emit the operation notification sound synthesized by the synthetic circuit.

The present configuration enables to emit the operation notification sound, which is imitative of the sound emitted from the electric motor for traveling. In addition, the operation notification sound is synthesized according to the driving signal received from the control device for the electric motor equipped to the vehicle. Accordingly, the operation notification sound can be emitted, without a memory device storing a sound source waveform of the operation notification sound.

The electric motor other than (distinct from) the electric motor for traveling may be the three-phase electric motor. In this case, the synthetic circuit may be configured to receive the three-phase driving signal from the control device for the electric motor other than (distinct from) the control device for the electric motor for traveling and to synthesize the operation notification sound according to the three-phase driving signal. The present configuration enables to synthesize the operation notification sound according to the three-phase driving signal being the same kind as the driving signal for the electric motor for traveling. Accordingly, the operation notification sound similar to the sound emitted from the electric motor for traveling can be emitted.

The synthetic circuit may synthesize the operation notification sound including the high frequency component accompanied with the three-phase driving signal. The present configuration enables to emit the operation notification sound similar to the sound emitted from the electric motor for traveling.

The operation notification sound emission device may further include the prohibition unit (62) configured to prohibit electricity supply to the other (distinct) electric motor when receiving the driving signal from the control device for the other (distinct) electric motor. The present configuration enables to prohibit electricity supply to the other (distinct) electric motor when receiving the driving signal from the control device for the other (distinct) electric motor. Consequently, unnecessary power consumption can be restrained, and undesirable movement of the other (distinct) electric motor can be restrained.

The prohibition unit may put the output circuit (35), which sends the control signal to the driver circuit (37) for the other (distinct) electric motor, into an OFF state. The present configuration enables to restrain unnecessary power consumption and undesirable movement of the other (distinct) electric motor.

The synthetic circuit may receive the driving signal from the control device (21-38) for the electric motor (13) for the parking lock device (2) of the vehicle. That is, the other (distinct) electric motor may be the electric motor of the parking lock device. The present configuration enables to utilize the control device for the electric motor of the parking lock device. When the vehicle is traveling, the parking lock device is required to generate to emit the operation notification sound. In addition, when the vehicle is traveling, the parking lock device is set at the drive position, and the electric motor of the parking lock device is not driven. Therefore, the operation notification sound can be emitted in the condition where the parking lock device is not used and is in the idle state.

The control device (21-38) for the parking lock device (2) may include the first control unit (32a) configured to produce a control for the parking lock device and the second control unit (32b) configured to send the driving signal for producing the rotation state similar to the rotation state of the electric motor for traveling. With the present configuration, the control device for the parking lock device is enabled to cause the first control unit to produce the control function as the parking lock device. In addition, the control device for the parking lock device is enabled to cause the second control device to send the driving signal for producing the rotation state of the electric motor of the parking lock device similar to the rotation state of the electric motor for traveling. The present configuration is enabled to emit the operation notification sound similar to the sound emitted from the electric motor, by synthesizing the operation notification sound according to the driving signal.

The operation notification sound emission device is equipped to a vehicle configured to travel with the electric motor for traveling (12), as a power source. The operation notification sound emission device is configured to emit the operation notification sound to notify the vehicle being in an operation state. The operation notification sound emission device includes the synthetic circuit (52) configured to synthesize the operation notification sound, which is imitative of the sound emitted from the electric motor for traveling, according to the signal for driving the inverter (39) connected between the control device (420) for the electric motor for traveling and the electric motor for traveling (12). In this case, the operation notification sound emission device may further include the emission unit (55, 56, 58) configured to emit the operation notification sound synthesized by the synthetic circuit.

The synthetic circuit receives the driving signal from the control device for the electric motor for traveling. The present configuration enables to receive the driving signal from the control device for the electric motor for traveling. Accordingly, the operation notification sound similar to the sound emitted from the electric motor for traveling can be emitted.

Each of the reference numerals in the parenthesis represents one example of a correspondence with the element in the embodiment(s) and does not limit the technical scope of the present disclosure.

The adjective of "first" and "second", such as the first control device and the second control device, do not necessarily limit the relation of primary and secondary. The adjective of "distinct" and "other" do not necessarily represent secondary or auxiliary.

The above structures of the embodiments can be combined as appropriate.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An operation notification sound emission device equipped to a vehicle configured to travel with a traveling electric motor as a power source, the traveling electric motor being configured to be controlled with a first control device, the operation notification sound emission device being configured to emit an operation notification sound to notify the vehicle being in an operation state, the operation notification sound emission device comprising:
    a synthetic circuit configured to
        receive a driving signal from a second control device for an other electric motor, wherein the second control device is distinct from the first control device, wherein the other electric motor is distinct from the traveling electric motor, and
        synthesize, according to the driving signal, the operation notification sound imitative of a motor sound emitted from the traveling electric motor; and
    an emission unit configured to emit the operation notification sound synthesized by the synthetic circuit, wherein:
    the driving signal controls the other electric motor, and
    the other electric motor is a three-phase electric motor, and
    the synthetic circuit is further configured to:
        receive a three-phase driving signal from the second control device and
        synthesize the operation notification sound according to the three-phase driving signal.

2. The operation notification sound emission device according to claim 1, wherein the second control device is configured to implement either one of:
    control of the other electric motor when the vehicle is not in the operation state; and
    generation of the driving signal when the vehicle is in the operation state.

3. The operation notification sound emission device according to claim 1, wherein the synthetic circuit is further configured to synthesize the operation notification sound including a high frequency component caused by the three-phase driving signal.

4. The operation notification sound emission device according to claim 1, further comprising:
    a prohibition unit configured to prohibit electricity supply to the other electric motor when receiving the driving signal from the second control device.

5. The operation notification sound emission device according to claim 4, wherein the prohibition unit is further configured to put an output circuit, which is for sending a control signal to a driver circuit for the other electric motor, into an OFF state.

6. The operation notification sound emission device according to claim 1, wherein the synthetic circuit is further configured to receive the driving signal from the second control device for a parking lock device of the vehicle.

7. The operation notification sound emission device according to claim 6, wherein the second control device includes:
    a first control unit configured to control the parking lock device; and
    a second control unit configured to send the driving signal for producing a rotation state similar to a traveling rotation state of the traveling electric motor.

8. An operation notification sound emission device equipped to a vehicle configured to travel with a traveling electric motor as a power source, the traveling electric motor being configured to be controlled with a first control device, the operation notification sound emission device being configured to emit an operation notification sound to notify the vehicle being in an operation state, the operation notification sound emission device comprising:
    a synthetic circuit configured to receive a driving signal from a second control device for an other electric motor, wherein the second control device is distinct from the first control device, wherein the other electric motor is distinct from the traveling electric motor, and synthesize, according to the driving signal, the operation notification sound imitative of a motor sound emitted from the traveling electric motor; and an emission unit configured to emit the operation notification sound synthesized by the synthetic circuit; wherein the other electric motor is a three-phase electric motor, and the synthetic circuit is further configured to receive a three-phase driving signal from the second control device and synthesize the operation notification sound according to the three-phase driving signal.

9. The operation notification sound emission device according to claim 8, wherein the synthetic circuit is further configured to synthesize the operation notification sound including a high frequency component caused by the three-phase driving signal.

10. An operation notification sound emission device equipped to a vehicle configured to travel with a traveling electric motor as a power source, the operation notification sound emission device being configured to emit an operation notification sound to notify the vehicle being in an operation state, the operation notification sound emission device comprising:

a synthetic circuit configured to synthesize the operation notification sound, which is imitative of a motor sound emitted from the traveling electric motor, according to a signal for driving an inverter connected between a control device for the traveling electric motor and the traveling electric motor; and an emission unit configured to emit the operation notification sound synthesized by the synthetic circuit; wherein the control device for the travelling electric motor generates and outputs the signal for driving the inverter to both of the inverter and the synthetic circuit, the traveling electric motor is a three-phase electric motor; and the synthetic circuit is further configured to:

receive a three-phase driving signal from the control device; and synthesize the operation notification sound according to the three-phase driving signals.

* * * * *